United States Patent
Zhu et al.

(10) Patent No.: US 11,171,862 B2
(45) Date of Patent: Nov. 9, 2021

(54) MULTI-SUBFLOW NETWORK TRANSMISSION METHOD AND APPARATUS

(71) Applicant: Huawei Technologies Co., Ltd., Shenzhen (CN)

(72) Inventors: Jianjian Zhu, Shenzhen (CN); Wei Liu, Shenzhen (CN); Jing Zuo, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 255 days.

(21) Appl. No.: 16/557,140

(22) Filed: Aug. 30, 2019

(65) Prior Publication Data

US 2019/0386911 A1 Dec. 19, 2019

Related U.S. Application Data

(63) Continuation of application No. PCT/CN2018/077581, filed on Feb. 28, 2018.

(30) Foreign Application Priority Data

Mar. 2, 2017 (CN) .......................... 201710121110.7
Apr. 25, 2017 (CN) .......................... 201710278562.6

(51) Int. Cl.
*H04L 12/707* (2013.01)
*H04W 76/15* (2018.01)
(Continued)

(52) U.S. Cl.
CPC .............. *H04L 45/24* (2013.01); *H04L 45/54* (2013.01); *H04L 47/621* (2013.01); *H04L 69/14* (2013.01); *H04W 76/15* (2018.02)

(58) Field of Classification Search
None
See application file for complete search history.

(56) References Cited

U.S. PATENT DOCUMENTS 7,733,913 B1  6/2010  Cheung et al.
9,742,638 B1 *  8/2017  McCabe ............. H04L 41/5009
(Continued)

FOREIGN PATENT DOCUMENTS

CN  101399737 A  4/2009
CN  101895466 A  11/2010
(Continued)

OTHER PUBLICATIONS

Machine Translation and Abstract of Chinese Publication No. CN104735726, Jun. 24, 2015, 22 pages.
(Continued)

*Primary Examiner* — Khaled M Kassim
(74) *Attorney, Agent, or Firm* — Conley Rose, P.C.

(57) ABSTRACT

A network transmission method comprises determining at least one network status parameter of the subflows. When at least one network status parameter of at least two of the plurality of subflows satisfies a preset condition, the method further comprises performing aggregated transmission for the data using the at least two subflows, wherein the aggregated transmission means that one data packet is sent using only one of the at least two subflows, and data packets sent using all of the at least two subflows are different from each other.

16 Claims, 10 Drawing Sheets

(51) Int. Cl.
*H04L 12/741* (2013.01)
*H04L 12/863* (2013.01)
*H04L 29/06* (2006.01)

(56) References Cited

U.S. PATENT DOCUMENTS

| | | | |
|---|---|---|---|
| 2001/0010710 A1* | 8/2001 | Kim | H03M 13/258 375/265 |
| 2002/0114269 A1* | 8/2002 | Onggosanusi | H04L 1/0618 370/208 |
| 2002/0116460 A1* | 8/2002 | Treister | H04W 84/20 709/204 |
| 2002/0136268 A1* | 9/2002 | Gan | H04B 1/7136 375/133 |
| 2003/0021336 A1* | 1/2003 | Iwasaki | H04B 17/336 375/147 |
| 2003/0048833 A1* | 3/2003 | Araya | H04B 1/7113 375/147 |
| 2004/0261118 A1* | 12/2004 | Booth | H04N 21/6168 725/124 |
| 2006/0215577 A1* | 9/2006 | Guichard | H04L 45/00 370/254 |
| 2008/0101403 A1* | 5/2008 | Michel | H04L 1/1845 370/465 |
| 2008/0267184 A1* | 10/2008 | Arisoylu | H04L 45/245 370/391 |
| 2009/0059877 A1* | 3/2009 | Utsunomiya | H04W 74/0808 370/338 |
| 2010/0128596 A1* | 5/2010 | Saitoh | H04L 45/28 370/216 |
| 2010/0287516 A1* | 11/2010 | Chowdhury | G06F 30/3312 716/123 |
| 2012/0260185 A1* | 10/2012 | Choc | G06Q 30/0241 715/738 |
| 2013/0212280 A1 | 8/2013 | Chesson | |
| 2014/0079016 A1* | 3/2014 | Dai | H04W 72/0446 370/330 |
| 2015/0016258 A1* | 1/2015 | Okner | H04L 47/30 370/235 |
| 2015/0381474 A1 | 12/2015 | Ao et al. | |
| 2016/0134519 A1 | 5/2016 | Ouedraogo et al. | |
| 2016/0192326 A1* | 6/2016 | Park | H04W 72/005 370/312 |
| 2016/0381701 A1* | 12/2016 | Kwok | H04L 1/0018 370/329 |
| 2018/0254979 A1* | 9/2018 | Scahill | H04L 47/193 |
| 2018/0331946 A1* | 11/2018 | Olofsson | H04L 61/1511 |
| 2018/0367445 A1* | 12/2018 | Bajaj | H04L 43/04 |
| 2019/0297534 A1* | 9/2019 | Hwang | H04L 47/263 |

FOREIGN PATENT DOCUMENTS

| | | |
|---|---|---|
| CN | 102271048 A | 12/2011 |
| CN | 103780511 A | 5/2014 |
| CN | 104735726 A | 6/2015 |
| CN | 104954206 A | 9/2015 |
| EP | 2899929 A1 | 7/2015 |
| EP | 2352253 B1 | 12/2017 |

OTHER PUBLICATIONS

Machine Translation and Abstract of Chinese Publication No. CN101895466, Nov. 24, 2010, 11 pages.
Machine Translation and Abstract of Chinese Publication No. CN104954206, Sep. 30, 2015, 17 pages.
Paasch, C., et al., "Multipath TCP-Linux Kernel Implementation," retrieved from the internet http://www.multipath-tcp.org on Sep. 29, 2019, 2 pages.
Yang, F., et al., "Out-of-order Transmission for In-order Arrival Scheduling for Multipath TCP," 28th International Conference on Advanced Information Networking and Applications Workshops, May 13-16, 2014, pp. 749-752.
Foreign Communication From A Counterpart Application, PCT Application No. PCT/CN2018/077581, English Translation of International Search Report dated May 17, 2018, 2 pages.
Foreign Communication From A Counterpart Application, PCT Application No. PCT/CN2018/077581, English Translation of Written Opinion dated May 17, 2018, 5 pages.
Foreign Communication From A Counterpart Application, European Application No. 18760794.0, Extended European Search Report dated Nov. 27, 2019, 8 pages.

* cited by examiner

MULTI-SUBFLOW NETWORK TRANSMISSION METHOD AND APPARATUS

CROSS-REFERENCE TO RELATED APPLICATIONS

This application is a continuation of International Patent Application No. PCT/CN2018/077581 filed on Feb. 28, 2018, which claims priority to Chinese Patent Application No. 201710278562.6 filed on Apr. 25, 2017 and Chinese Patent Application No. 201710121110.7 filed on Mar. 2, 2017. The disclosures of the aforementioned applications are hereby incorporated by reference in their entireties.

TECHNICAL FIELD

The present disclosure relates to the field of network transmission, and in particular, to a multi-subflow data transmission method and apparatus.

BACKGROUND

With development of network technologies, in some network scenarios, there are a plurality of transmission links between a transmit end and a receive end of data. For example, a mobile terminal supports both WI-FI-based access and long term evolution (LTE)-based access, and there is a plurality of physical links between data center servers. A plurality of subflows are correlated and managed, and are concurrently used for aggregated transmission to improve bandwidth utilization and transmission performance.

For example, a multipath transmission control protocol (MPTCP) is a new transport layer protocol formulated by the Internet Engineering Task Force (IETF). According to the MPTCP, a unique meta-sock is used to receive data from an upper-layer application, and the meta-sock schedules and distributes, to sub-socks, managed by the meta-sock, of a plurality of subflows and according to a scheduling algorithm of a data scheduling module, the data delivered by an application layer, to perform transmission. In the MPTCP, a scheduling rule of a default scheduling algorithm in a protocol stack is to schedule data sending in a subflow corresponding to a smallest round trip time (RTT).

Transmission delays of subflows vary. Therefore, data packets sequentially sent by a transmit end in the subflows may arrive at a receive end out of order, and the receive end needs to cache and process the out-of-order data packets. On an actual network, a network connection of a subflow is not always in a stable state. For example, in a transmission control protocol (TCP) connection, at a TCP slow start stage, a data transmission rate of a subflow is limited by a change of a congestion window, and the change of the congestion window approximates to an exponential change model at the slow start stage. In this case, transmission delays of subflows are in a changing state, increasing difficulty in processing out-of-order data packets by a receive end and increasing a quantity of data packets that need to be cached. As a result, efficiency and stability of aggregated transmission are reduced.

SUMMARY

Embodiments of the present disclosure provide a network transmission method and a network transmission apparatus to implement multi-subflow network data transmission.

According to one aspect, an embodiment of this application provides a network transmission method. According to the method, at least one network status parameter of a plurality of subflows is first determined. When the network status parameter of at least two subflows satisfies a preset condition, aggregated transmission is performed for data using the at least two subflows. The aggregated transmission means that one data packet is sent using only one of the at least two subflows, and data packets sent using all of the at least two subflows are different from each other. Therefore, when the network status parameter satisfies the preset condition, the subflows are in a stable transmission state. In this case, when the aggregated transmission is performed, a network latency of the subflows used for the transmission is in a stable and predictable state such that the aggregation transmission can be performed depending on a predicted network latency, thereby improving transmission stability and efficiency.

In a possible implementation, when the at least one network status parameter of at least one of the plurality of subflows does not satisfy the preset condition, redundant transmission is performed for the data separately using the at least one subflow. The redundant transmission means that data packets are sent using all of the at least one subflow, and the data packets sent using all of the at least one subflow are the same. Therefore, when the network status does not satisfy the preset condition, the subflow is in an unstable transmission state. In this case, the redundant transmission is performed. This can improve transmission reliability, and reduce impact, caused by an unpredictable network latency, on transmission quality and a transmission rate.

When the network status parameter satisfies the preset condition, the network status parameter may include a real-time transmission rate, such as a current network transmission rate of the subflow, a congestion control window, such as a maximum quantity of data packets that can be sent by a transmit end each time under congestion control, a receive window, such as a receiver sets the receive window depending on a receiving capability of the receiver, writes this window value into a window field in a TCP header, and transmits the TCP header to a sender such that the sender can learn a quantity of receive windows, a quantity of transmitted data packets, such as a quantity of data packets that have been successfully transmitted to a receive end and acknowledged by the receive end, or a quantity of bytes of the data packets, a quantity of transmitted data packets that are not acknowledged, such as a quantity of data packets that are sent to a receive end but have not been acknowledged by the receive end, or a quantity of bytes of the data packets, a transmission time, such as a time from a time point at which a network data link is established to a current time point, a transmission delay variation, such as a difference between a transmission sequence or a time interval at which a data packet is sent and a transmission sequence or a time interval at which the data packet arrives at a receive end, or a packet loss rate, such as a ratio of a quantity of lost data packets in a quantity of sent data packets.

In a possible implementation, the network status parameter and the preset condition include that a link transmission delay difference between the at least two subflows is less than or equal to a corresponding threshold, and the sent data packet includes a first data packet. The first data packet includes a sending time of the first data packet. The transmit end sends the data packet, and obtains the link transmission delay difference that is calculated by the receive end based on the data packet to determine the link transmission delay difference.

In a possible implementation, the network status parameter and the preset condition include that a link transmission delay difference between the at least two subflows is less than or equal to a corresponding threshold, and the sent data packet includes a first data packet. The first data packet includes an identifier of a second data packet and a sending time difference between the first data packet and the second data packet. The second data packet is a data packet sent using a subflow in the at least two subflows that is different from a subflow in the at least two subflows that is used to send the first data packet. The transmit end sends the data packet, and obtains the link transmission delay difference that is calculated by the receive end based on the data packet, to determine the link transmission delay difference.

In a possible implementation, the network status parameter and the preset condition include that a link transmission delay difference between the at least two subflows is less than or equal to a corresponding threshold, and the sent data packet includes a first data packet. The first data packet includes an identifier of a third data packet. The third data packet is a data packet sent simultaneously with the first data packet or sent at a preset time interval and sent using a subflow in the at least two subflows that is different from a subflow in the at least two subflows that is used to send the first data packet. The transmit end sends the data packet, and obtains the link transmission delay difference that is calculated by the receive end based on the data packet, to determine the link transmission delay difference.

The identifier of the second data packet or the identifier of the third data packet may be an identifier directly used to indicate the data packet, or may be an identifier that is the same as an identifier carried in the second data packet or the third data packet, to represent a correlation relationship between the first data packet and the second data packet or the third data packet. In a possible implementation, the identifier may be a feature of the data packet. The receive end determines, using a preset determining condition, that the received data packet is the second data packet or the third data packet.

In a possible implementation, when a sum of transmission rates of the aggregated transmission is less than or equal to a corresponding threshold, redundant transmission is performed for the data separately using the at least two subflows. When an aggregated transmission rate is excessively low, a network may be in an unstable transmission state. If the data is transmitted through the redundant transmission, transmission reliability can be improved.

In a possible implementation, a cache queue of to-be-sent data is set for each subflow, to store a data packet allocated to the subflow. During the aggregated transmission, a data packet of the data is placed in a cache queue of to-be-sent data of one of the at least two subflows. In the at least two subflows, a data amount in a cache queue of to-be-sent data of a subflow corresponding to a larger transmission delay is less than a data amount in a cache queue of to-be-sent data of a subflow corresponding to a smaller transmission delay. Cache queues with different data amounts are set such that a wait time of a data packet in a cache queue can be used to cancel a time difference caused by a transmission delay of a subflow. Therefore, a possibility that data packets arrive at the receive end out of order is reduced, and data transmission quality is improved.

In a possible implementation, during determining of the subflow in which the data packet needs to be placed, the data packet of the data is placed in a cache queue of to-be-sent data of one of the at least two subflows such that a difference between data amounts in cache queue of to-be-sent data of the at least two subflows and transmission delays of the at least two subflows satisfy a preset relationship. Therefore, when the difference between the data amounts and the transmission delays of the subflows satisfy the preset relationship, a wait time of the data packet in the cache queue can be used to cancel a time difference caused by a transmission delay of the subflow. Therefore, a possibility that data packets arrive at the receive end out of order is reduced, and data transmission quality is improved.

In an implementation of this implementation, the difference between the data amounts in the cache queues is a result obtained by multiplying a transmission delay difference between the subflows by a data transmission amount of the subflow in a unit time.

In a possible implementation, during determining of the subflow in which the data packet needs to be placed, the data packet of the data is placed in a subflow in the at least two subflows corresponding to a shortest estimated total transmission time. The estimated total transmission time is an estimated time from a time point at which the data packet enters the cache queue of to-be-sent data to a time point at which the data packet arrives at the receive end. Therefore, the subflow corresponding to the shortest estimated total transmission time is selected using a clock such that estimated times of all the subflows are relatively consistent, data consistency is improved when the data is sent using the subflows, and out-of-order data packets are reduced.

In a possible implementation, a quantity of data packets in a cache queue of to-be-sent data of each subflow is not greater than a threshold corresponding to the subflow. A data amount in a cache queue is controlled, to avoid that because the cache queue is excessively long, a time from a time point at which a data packet is allocated to a subflow to a time point at which the data packet is sent using the subflow is excessively long, and a network latency of the subflow changes, consequently, an actual total transmission time of the data packet is different from an estimated total transmission time, and out-of-order data packets appear at the receive end.

In a possible implementation, a quantity of data packets in a cache queue of to-be-sent data of each subflow and a quantity of bytes of a send window of the subflow satisfy a preset relationship. In another possible implementation, a quantity of data packets in a cache queue of to-be-sent data of each subflow and a maximum quantity of allowable data packets in flight in the subflow satisfy a preset relationship.

In a possible implementation, a stable transmission set and an unstable transmission set are set for the subflows. When the at least one network status parameter of a subflow satisfies the preset condition, the subflow is placed in the stable transmission set, otherwise, the subflow is placed in the unstable transmission set. When a quantity of subflows in the stable transmission set is greater than or equal to 2, the subflows in the stable transmission set are used to perform aggregation transmission. Alternatively, when all the subflows are in the stable transmission set, all the subflows are used to perform aggregated transmission.

According to another aspect, the present disclosure further provides a network transmission apparatus. The apparatus has a function of implementing the foregoing method. The function may be implemented by hardware, or may be implemented by hardware executing corresponding software. The hardware or the software includes one or more modules corresponding to the foregoing function.

In a possible implementation, the network transmission apparatus includes a monitoring module configured to determine a network status parameter of a subflow, and a sending module configured to perform aggregated transmission or redundant transmission based on the network status parameter. The sending module may perform the foregoing method to allocate a data packet to a subflow for sending.

In a possible implementation, a structure of the network transmission apparatus includes a processor, a memory, and a network interface. The processor is configured to support the network transmission apparatus in performing a corresponding function in the foregoing method. The network interface is configured to establish, with a receive end, a communications link including a plurality of subflows. The memory is configured to be coupled with the processor. The memory stores a program instruction and data that are required by the apparatus, and to-be-sent data.

According to still another aspect, an embodiment of the present disclosure provides a computer storage medium configured to store a computer software instruction used by the network transmission apparatus. The computer software instruction includes a program designed to perform the foregoing aspects.

Compared with other approaches, in the present disclosure, when the data is transmitted using the plurality of subflows, the at least one network status parameter of the plurality of subflows is first determined, and when the at least one network status parameter of the at least two of the plurality of subflows satisfies the preset condition, the aggregated transmission is performed for the data packets using the at least two subflows. Therefore, all the subflows used for the aggregated transmission are subflows in a stable transmission state. This avoids the following case. Because it is difficult to predict a transmission delay of a subflow in an unstable transmission state, the receive end receives a large quantity of out-of-order data packets, and therefore occupies caching space and consumes a processing capability. Efficiency and stability of the aggregated transmission are improved.

DESCRIPTION OF EMBODIMENTS

To make the objectives, technical solutions, and advantages of the present disclosure clearer, the following further describes the embodiments of the present disclosure in detail with reference to accompanying drawings.

The MPTCP is mentioned in the following descriptions. The MPTCP allows data communication, across a plurality of subflows on a network, in a transmission connection between network devices. It should be noted that these descriptions are merely used as an example. Technologies or mechanisms in the described embodiments may be applied to another protocol that allows a plurality of subflows to be simultaneously used in a connection between a plurality of network devices. A "connection" between network devices is a session established using a preset process (for example, a process defined by the MPTCP, the TCP, or another protocol). A connection network between network devices may have one or more intermediate devices, for example, a router, a switch, a firewall, a network address translator, or a proxy. A subflow is a packet flow of a connection (for example, a TCP connection), wherein the packet flow is transmitted on a path. Generally, one subflow is an independent TCP connection. Such connections form an MPTCP connection. A start and an end of a subflow are the same as those of a conventional TCP connection.

Figure 1:
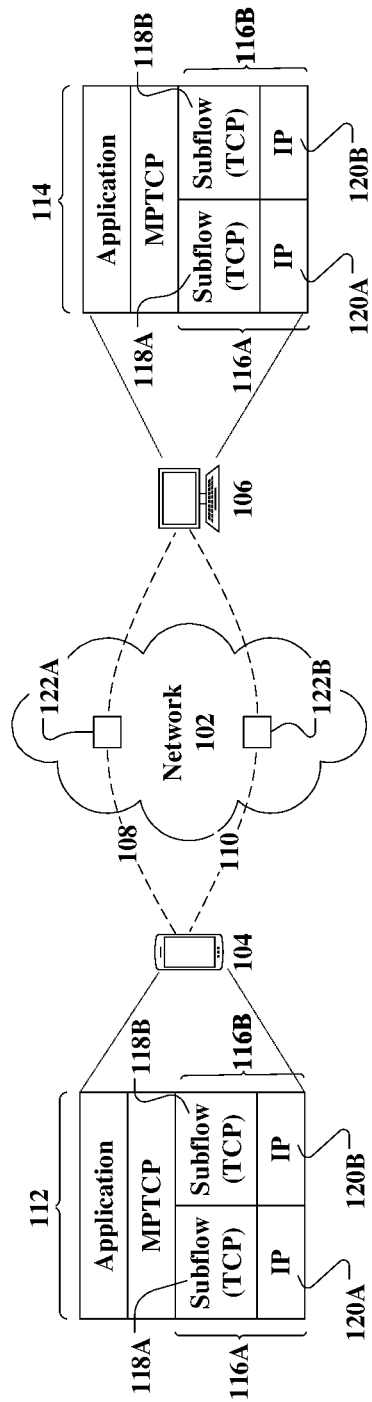
FIG. 1 is a schematic diagram of an application scenario according to an embodiment of the present disclosure.

FIG. 1 is a schematic diagram of a scenario in which a network 102 that is connected to a first network device 104 and a second network device 106 is included. Although only the two network devices are described, it should be noted that the network 102 may be connected to an additional network device. An example of a network device includes a personal digital assistant, a mobile phone, a tablet computer, a notebook computer, a desktop computer, an Internet of Things terminal, an intelligent car, a server computer, a storage controller, an electronic device, or another type of electronic network device.

In the example shown in FIG. 1, a plurality of subflows 108 and 110 may be provided in a connection established between the network devices 104 and 106. Although only the two subflows 108 and 110 are shown for the connection between the network devices 104 and 106, it should be noted that a connection between network devices may have more than two subflows. A plurality of connections may be alternatively established for the network devices 104 and 106, and each connection may be correlated with a subflow set corresponding to the connection. In some examples, the first subflow 108 may be a part of a path on a mobile communications network (for example, a cellular network), and the second subflow 110 may be on a wireless local area network. In another example, the subflow 108 or 110 may be a part of a wired path.

As shown in FIG. 1, in a scenario in which the MPTCP is used, each of the network devices 104 and 106 includes corresponding MPTCP stacks 112 and 114. The protocol stack 112 or 114 includes an application layer (including application software) and an MPTCP layer (used to implement an MPTCP function). For each subflow, there is one TCP/Internet Protocol (IP) instance 116A or 116B in the protocol stack 112 or 114. It should be noted that there are two TCP/IP instances 116A and 116B because there are two subflows in the example shown in FIG. 1. If there are more subflows for the connection between the network devices 104 and 106, an additional TCP/IP instance is to be provided in the protocol stack 112 or 114.

Each TCP/IP instance 116A or 116B includes a corresponding TCP layer 118A or 118B and a corresponding IP layer 120A or 120B. The MPTCP layer defines connection-level (or data-level) connection-borne communication, and each TCP layer defines subflow-level communication. Although the MPTCP layer and the TCP/IP instance are used to describe each protocol stack 112 or 114, it should be noted that another type of protocol layer may be included depending on a protocol stack of another implementation.

The MPTCP is designed to be backward-compatible with an existing network component. In some cases, the network 102 may include one or more blocking intermediate devices 122A and 122B, also referred to as sequence hole blocking middle boxes. An example of the blocking intermediate device includes a firewall, a network address translator, a proxy (for example, a performance enhancing proxy), or any other intermediate device. The blocking intermediate device is located on a routing path of a packet between a transmitter device and a receiver device, and for example, when the intermediate device detects that a sequence number of a packet received by the intermediate device 122A or 122B becomes discontinuous, prevents forwarding the packet to a destination. That is, if the blocking intermediate device detects that there is a sequence hole in the packet received by the intermediate device, the blocking intermediate device prevents forwarding, to the destination, a packet whose sequence number is after a lost sequence number or is greater than a lost sequence number. In an alternative implementation, the blocking intermediate device may prevent forwarding a packet if the blocking intermediate device detects another feature in a packet flow coming from the transmitter device. When the blocking intermediate device is located on the routing path of the packet between the transmitter device and the receiver device, the blocking intermediate device is in a path of a subflow.

In the example shown in FIG. 1, the intermediate devices 122A and 122B are provided in the corresponding subflows 108 and 110. In an alternative example, the blocking intermediate device is provided in only one of the subflows 108 and 110. For another example, one or both of the intermediate devices 122A and 122B may be a non-blocking intermediate device (even if there is a sequence hole in a packet, the non-blocking intermediate device also allows the packet to be forwarded to a destination). Assuming that the intermediate device 122A or 122B is a blocking intermediate device, if the blocking intermediate device detects a sequence hole along a corresponding subflow (108 or 110), the blocking intermediate device prevents forwarding a packet along the subflow.

Figure 2:
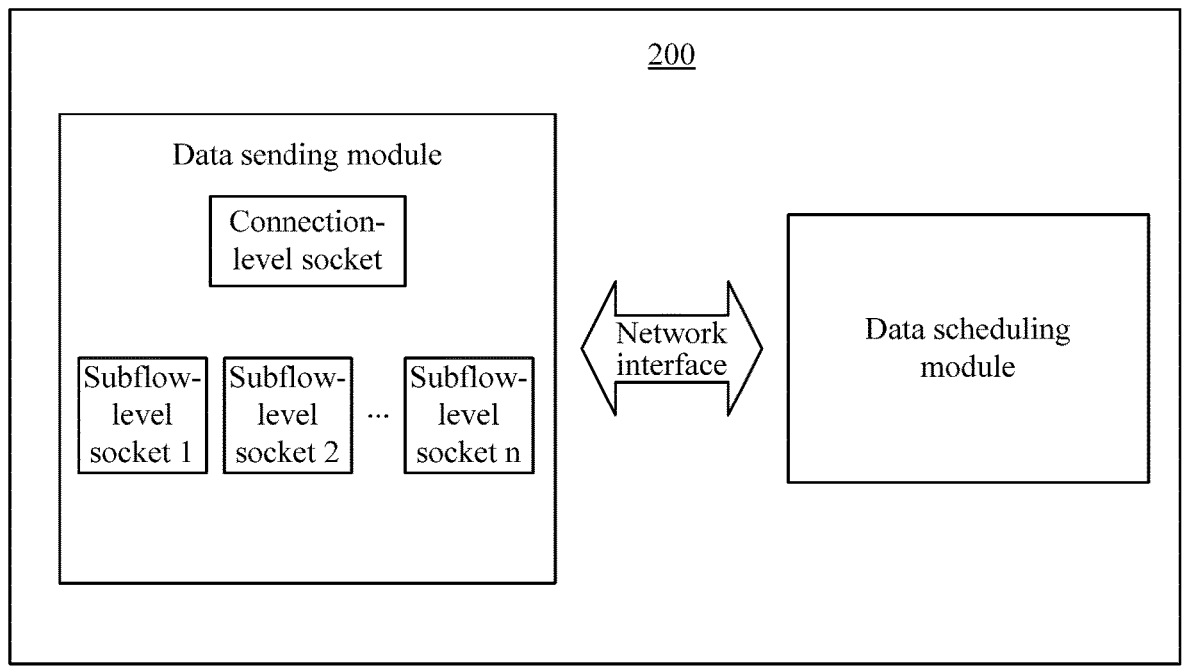
FIG. 2 is a schematic diagram of modules of an MPTCP network apparatus according to an embodiment of the present disclosure.

FIG. 2 is a schematic diagram of modules of an MPTCP network device 200 according to an embodiment of the present disclosure. According to the MPTCP, a unique meta-sock (a connection-level socket) is used to receive data from an upper-layer application, and the meta-sock schedules and distributes, to sub-socks (subflow-level sockets), managed by the meta-sock, of a plurality of subflows and according to a scheduling algorithm of a data scheduling module, the data delivered by an application layer, to perform transmission.

In the following descriptions, for ease of understanding, main concepts included in the embodiments are first explained.

Aggregated transmission: During data transmission, a manner in which one data packet is transmitted using only one subflow and data packets transmitted in all subflows are different from each other is the aggregated transmission. The aggregated transmission can save network resources, and maximally use bandwidth of each subflow to improve data transmission efficiency. Based on understanding with reference to the logical modules shown in FIG. 2, the upper-layer application transmits the data to the meta-sock, and the meta-sock stores the data in a write queue. During aggregated transmission, when subflows are used to send data, data is started to be obtained from a location, in the write queue, of data that has not been acknowledged by a receive side and that has not been sent using any subflow, and then the data is sent. For example, as shown in FIG. 3, data packets 1 to 5 are data sent through aggregated transmission using a subflow 1 and a subflow 2, and data packets sent using the subflow 1 and the subflow 2 are different from each other.

Redundant transmission: During data transmission, one data packet may be repeatedly transmitted by each subflow, that is, all the subflows transmit a same data packet. Such a manner is the redundant transmission. The redundant transmission can ensure data reliability, and reduce processing load of a receive end when the receive end receives data. With reference to FIG. 2, the upper-layer application transmits the data to the meta-sock, and the meta-sock stores the data in a write queue. When subflows are used to send data, data is started to be obtained from a location, in the write queue, of data that has not been acknowledged by a receive side and that has not been sent using any subflow, and then the data is sent. For example, as shown in FIG. 3, data packets 6 to 10 are data sent through redundant transmission using a subflow 1 and a subflow 2, data packets sent using the subflow 1 and the subflow 2 are same data packets, and each data packet is sent in both the two subflows.

Figure 3:
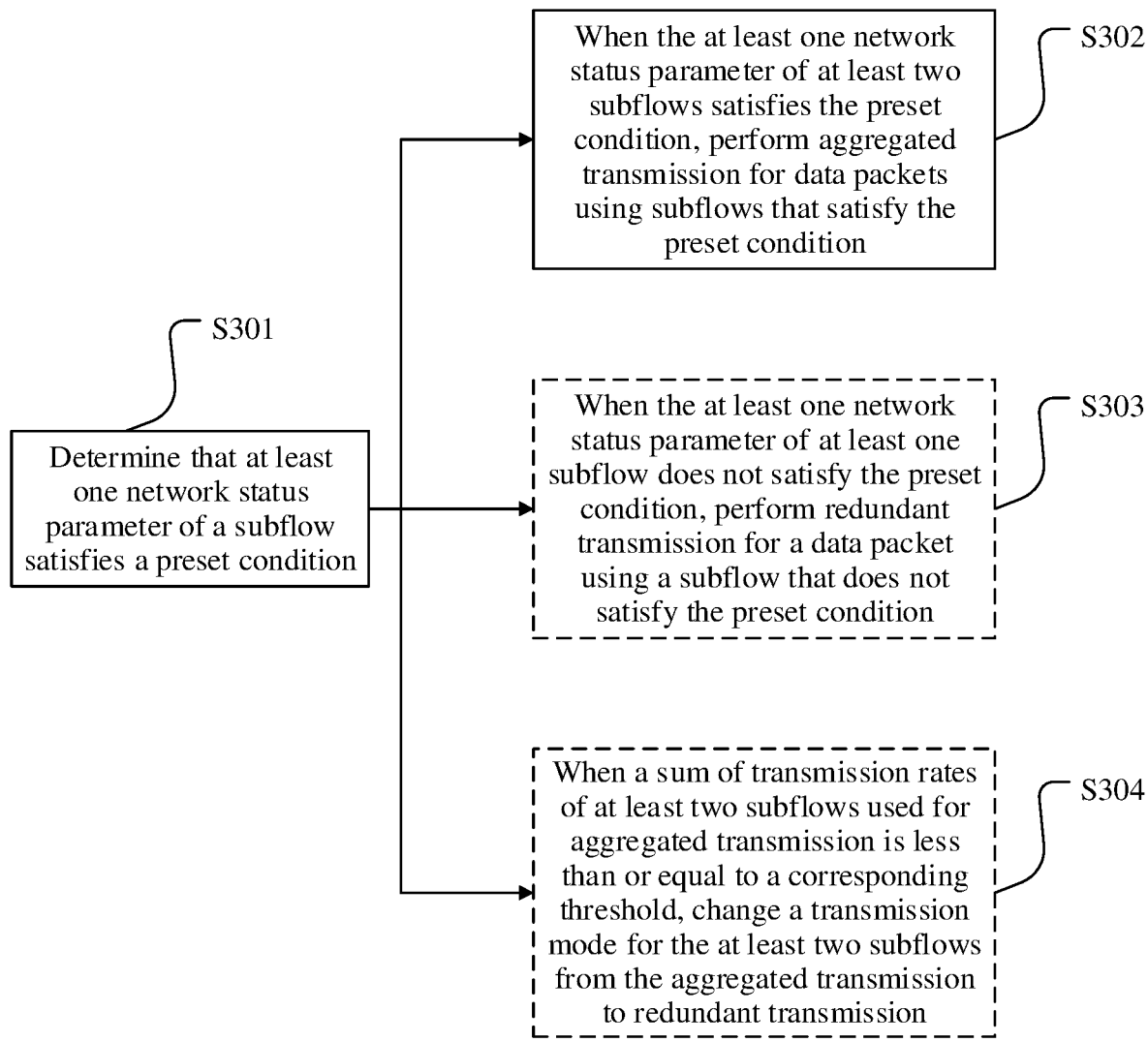
FIG. 3 is a schematic flowchart of a method according to an embodiment of the present disclosure.

With reference to FIG. 3, FIG. 3 is a schematic flowchart of a method of a network transmission method embodiment according to the present disclosure. This embodiment is executed by a transmit end in a network device for which a plurality of subflows are established to transmit data. To be specific, in the example shown in FIG. 1, when the network device 104 sends data to the network device 106, this embodiment is executed by the network device 104, otherwise, when the network device 106 sends data to the network device 104, this embodiment is executed by the network device 106. In this embodiment, a to-be-sent data packet from the transmit end is in a cache queue of to-be-sent data, and a plurality of subflows that can be used to transmit data have been established between the transmit end and a receive end. For transmission of a to-be-sent data packet, this embodiment includes the following steps.

Step S301. Determine that at least one network status parameter of a subflow satisfies a preset condition.

After a link is successfully established for a subflow, the transmit end monitors at least one preset network status parameter of each subflow, to monitor a network status of each subflow. Based on a preset condition correspondingly set for the monitored network status parameter, it is determined whether the network status of the subflow is stable. When the monitored network status parameter satisfies the preset condition, it is considered that the subflow enters a stable transmission state. The stable transmission state means that a value of a network latency of the subflow is relatively stable or is in a predictable regular change. In the stable transmission state, the transmit end can obtain or predict the network latency of the subflow in a relatively accurate manner. For example, at a TCP slow start stage, a data transmission rate of a subflow is limited by a change of a congestion window, and the change of the congestion window approximates to an exponential change model at the slow start stage. Therefore, in this case, a change of a network latency of the subflow is unstable and difficult to predict, and this stage is not a stable transmission stage. After this, the change of the congestion window of a TCP link approximates to a linear regular increase. In this case, the network latency is at a predictable change stage, and the subflow is at a stable transmission stage.

In an implementation, the transmit end determines whether a subflow is in a stable transmission state depending on whether a link transmission delay difference between a plurality of subflows is less than or equal to a corresponding threshold. The link transmission delay difference is a difference between transmission delays of subflows among subflows used for transmission. When the transmission delay difference is relatively small, the transmission delays of the subflows are relatively close, and a network status is relatively stable.

The transmit end may obtain the link transmission delay difference between the subflows in a same manner. For example, corresponding information may be added to some or all of data packets in the subflows, and the receive end may determine the link transmission delay difference based on the information, and send the obtained link transmission delay difference to the transmit end using a response packet.

In an implementation, a sending time of some or all of the data packets of the subflows may be added to the data packets in a manner such as using a timestamp. The receive end determines the transmission delays of the subflows by receiving a data packet carrying the sending time, and calculates the link transmission delay difference between the subflows.

In another implementation, an identifier of another data packet transmitted in another subflow and a sending time difference between a data packet and the other data packet are added to the data packet. Therefore, the receive end can determine the sending time difference between the two data packets in two links, and determine, based on a receive time difference between the two data packets, that a difference between the sending time difference and the receive time difference is a link transmission delay difference between the two subflows. For example, an identifier of a data packet B transmitted in a subflow is added to a data packet A in another subflow, where the identifier may directly indicate the data packet B, or the data packet A and the data packet B carry a same identifier such that the receive end may identify, based on the identifier, the data packet B corresponding to the data packet A. The data packet A further includes a sending time difference M between the data packet A and the data packet B. If M is positive, it indicates that the data packet A is sent after the data packet B, otherwise, the data packet A is sent before the data packet B. After receiving the data packet A, the receive end may determine, based on a receive time Ta of the data packet A and a receive time Tb of the data packet B, that a link transmission delay difference between the two subflows is Tb−Ta−M. When the difference is positive, a transmission delay of a link on which the data packet A is located is less than that of a link on which the data packet A is located, otherwise, a transmission delay of a link on which the data packet A is located is greater than that of a link on which the data packet A is located.

In still another implementation, an identifier of another data packet that is sent simultaneously with a data packet or sent at a preset time interval and that is transmitted in another subflow is added to the data packet. Therefore, the receive end determines a link transmission delay difference between the two subflows based on a receive time difference between the two data packets and the preset sending time interval. A difference between a principle of this implementation and that of the foregoing implementation lies in that a sending time difference between data packets is preset, and the time difference does not need to be included in the data packets, thereby reducing network consumption.

For example, a network status parameter used to determine a stable transmission state and a preset condition corresponding to the network status parameter may be one or more of the following.

A. A real-time transmission rate of a subflow reaches a preset rate.

In a possible implementation, it may be determined whether the real-time transmission rate of the subflow reaches the preset rate. Generally, when the transmission rate of the subflow reaches a specific rate, a network transmission status of the subflow tends to be stable. Therefore, based on a specific network status of the subflow, a corresponding preset rate may be set as a condition for determining a stable transmission state.

In another possible implementation, it may be determined whether the real-time transmission rate of the subflow is kept in a preset range within a preset period of time. When the real-time transmission rate of the subflow is kept in the preset range within the preset period of time, fluctuation of the transmission rate of subflow is relatively small, and it may be considered that a network transmission status of the subflow is stable.

B. A congestion control window of a subflow reaches a preset value.

The congestion control window is a maximum quantity of data packets that can be sent by the transmit end each time under congestion control. The transmit end presets a size value based on a network congestion level, and the value is the congestion window. A size of the congestion window depends on the network congestion level, and changes dynamically. The sender makes a send window of the sender be equal to the congestion window. If a receiving capability of the receiver is further considered, the send window may be alternatively less than the congestion window. Therefore, monitoring the congestion control window of the subflow may be used to determine whether a network transmission status of the subflow is stable.

C. A receive window of the receive end reaches a preset value.

For the receive window, the receiver sets the receive window depending on a receiving capability of the receiver, writes this window value into a window field in a TCP header, and transmits the TCP header to the sender such that the sender can learn a quantity of receive windows. Similar to the congestion control window, the receive window may also be used to determine whether a network status is stable.

D. A quantity of data packets transmitted using a subflow reaches a preset value.

The quantity of transmitted data packets is a quantity of data packets that have been successfully transmitted to the receive end and acknowledged by the receive end, or a quantity of bytes of the data packets. Early when a TCP connection is established, a network transmission status of the subflow is usually an unstable state, and after a specific amount of data is transmitted, the subflow enters a stable state. Therefore, based on the quantity of transmitted data packets, it may be determined whether a network status of the subflow is stable.

E. A quantity of data packets transmitted by a subflow that are not acknowledged reaches a preset value.

A transmitted data packet that is not acknowledged is a data packet, in a transmission process, that has not been acknowledged by the receive end. When the quantity of transmitted data packets that are not acknowledged reaches the preset value, it may indicate that a transmission rate reaches a stable value, and a network transmission status is a stable state.

F. Duration after data transmission in a subflow starts reaches a preset value.

As described above, early when a TCP connection is established, a network transmission status of the subflow is usually an unstable state, and after a specific period of time, the subflow enters a stable state. Therefore, it may also be determined, based on the duration after the data transmission starts, whether the subflow enters a stable transmission state.

G. A transmission delay variation is less than or equal to a preset value.

The transmission delay variation is a quantized value indicating that there is a difference between a transmission sequence or a time interval at which a data packet is sent and a transmission sequence or a time interval at which the data packet arrives at the receive end.

H. A packet loss rate is less than or equal to a preset value.

The foregoing network status parameters and preset conditions corresponding to the network status parameters are merely examples. A person skilled in the art may also determine, with reference to the other approaches and using other parameters and conditions used to determine a stable network state, whether a subflow enters a stable transmission state.

Step S302. When at least one network status parameter of at least two subflows satisfies the preset condition, perform aggregated transmission for data packets using subflows that satisfy the preset condition.

According to the foregoing network status parameter, if the network status parameter of the at least two subflows satisfies the preset condition, the aggregated transmission is performed for the data packets using the at least two subflows. In a different implementation, one or more types of network status parameters of all of the at least two subflows may satisfy a preset condition, or different network status parameters of all of the at least two subflows may satisfy a preset condition. Correspondingly, even if determining is performed for all of the at least two subflows based on the one or more types of network status parameters, preset conditions corresponding to the network status parameter of the subflows may vary because the subflows vary. To be specific, it is determined whether the network status parameter satisfies the preset condition, to determine whether the subflow enters a stable transmission state.

With reference to the foregoing descriptions of the aggregated transmission, when the aggregated transmission is performed using the at least two subflows, data packets are sent by respectively using two subflows non-repeatedly, and the data packets sent using the subflows are different from each other. The transmit end obtains a to-be-sent data packet from a to-be-sent queue, and allocates the data packet to one of the at least two subflows for sending. After allocation, sending of the data packet is completed, and the data packet is not repeatedly allocated to another subflow. To be specific, when subflows are used to send data, data is started to be obtained from a location, in the to-be-sent queue, of data that has not been acknowledged by the receive side currently and that has not been sent using any subflow, and then the data is sent. A rule according to which the transmit end allocates data packets to different subflows is not limited in this embodiment.

Optionally, in this embodiment, the following step may be further included.

Step S303. When the at least one network status parameter of at least one subflow does not satisfy the preset condition, perform redundant transmission for a data packet using a subflow that does not satisfy the preset condition.

Among a plurality of subflows whose network status parameters are monitored, a subflow whose network status parameter does not satisfy the preset condition is used to transmit data through redundant transmission. All of the plurality of subflows may have a same network status parameter, or may have different network status parameters. A same network status parameter of the plurality of subflows may be corresponding to a same preset condition, or may be corresponding to different preset conditions corresponding to the subflows. Referring to the foregoing descriptions, when a network status parameter of a subflow does not satisfy the preset condition, it is considered that the subflow is in an unstable transmission state.

With reference to the foregoing explanations of the redundant transmission, all data packets included in the data are transmitted in each of subflows that are in an unstable transmission state. To be specific, each data packet is redundantly and repeatedly transmitted using each subflow. The transmit end obtains a to-be-sent data packet from a to-be-sent queue, and allocates the data packet to a subflow whose network status parameter does not satisfy the preset condition, and the data packet is sent using each subflow. To be specific, when subflows are used to send data, data is started to be obtained from a location, in the to-be-sent data queue, of data that has not been acknowledged by the receive side currently and that has not been sent by a current subflow, and then the data is sent.

Optionally, in this embodiment, the following step may be further included.

Step S304. When a sum of transmission rates of at least two subflows used for aggregated transmission is less than or equal to a corresponding threshold, change a transmission mode for the at least two subflows from the aggregated transmission to redundant transmission.

After the aggregated transmission is performed using the subflows whose network status parameter satisfies the preset condition in step S302, a sum of transmission rates of the subflows used for the aggregated transmission, namely, an aggregated transmission rate, is monitored. When the aggregated transmission rate is less than or equal to a corresponding threshold, a subflow in the aggregated transmission may be in an unstable transmission state. Therefore, the transmission mode for the subflows used for the aggregated transmission is changed from the aggregated transmission to the redundant transmission.

According to the method discussed in this embodiment, when the data is transmitted using the plurality of subflows, the at least one network status parameter of the plurality of subflows is first determined, and when the at least one network status parameter of the at least two of the plurality of subflows satisfies the preset condition, the aggregated transmission is performed for the data packets using the at least two subflows. Therefore, all the subflows used for the aggregated transmission are subflows in a stable transmission state. This avoids the following case. Because it is difficult to predict a transmission delay of a subflow in an unstable transmission state, the receive end receives a large quantity of out-of-order data packets, and therefore occupies caching space and consumes a processing capability. Efficiency and stability of the aggregated transmission are improved.

Figure 4:
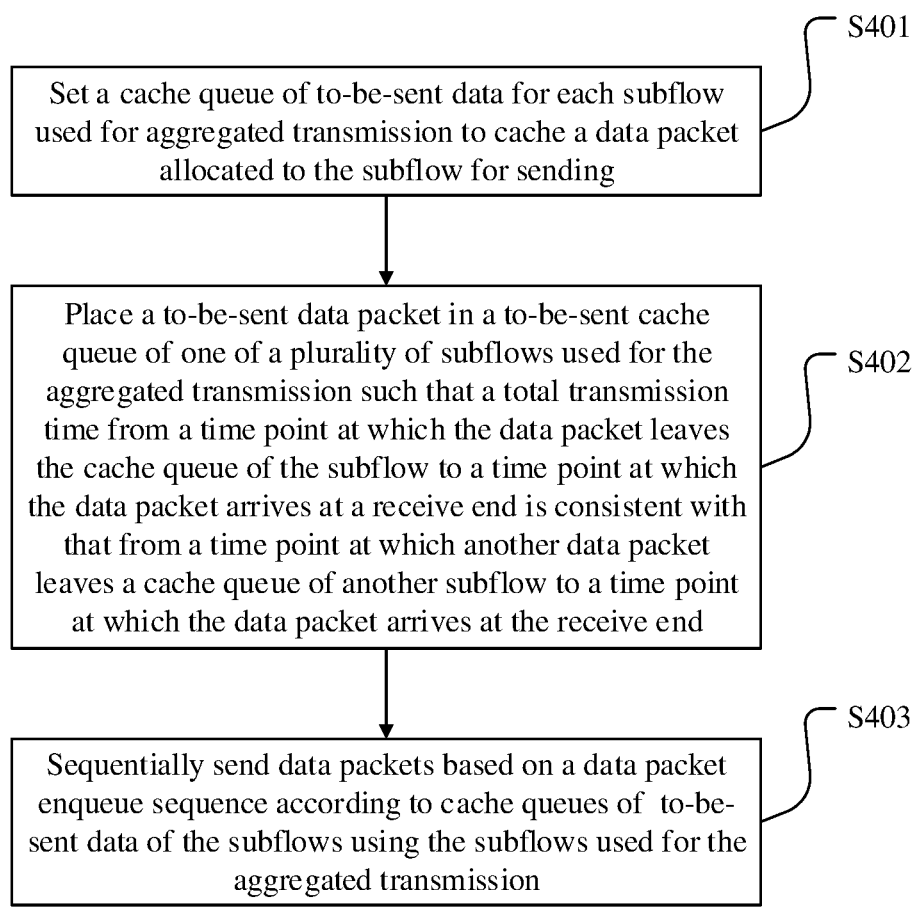
FIG. 4 is a schematic flowchart of another method according to an embodiment of the present disclosure.

With reference to FIG. 4, FIG. 4 is a schematic flowchart of a method according to another embodiment of the present disclosure. This embodiment is a further improvement based on the foregoing embodiment. Therefore, to avoid repetition, this embodiment is described with reference to the foregoing embodiment. Related steps in this embodiment may be understood with reference to the descriptions and explanations of the foregoing embodiment.

In this embodiment, with reference to the foregoing embodiment, when step S302 is performed after step S301, performing aggregated transmission for data packets using subflows that satisfy the preset condition may be implemented using the following steps.

Step S401. Set a cache queue of to-be-sent data (referred to as a cache queue in the following) for each subflow used for the aggregated transmission to cache a data packet allocated to the subflow for sending.

One cache queue of to-be-sent data is set for each subflow. When sending a data packet, the transmit end allocates, for sending, the data packet to one of the plurality of subflows used for the aggregated transmission. The data packet enters a cache queue of to-be-sent data of the subflow to which the data packet is allocated. After a data packet, entering the queue before the data packet, in the cache queue of to-be-sent data of the subflow is sent, the data packet is dequeued and sent.

Figure 5A:
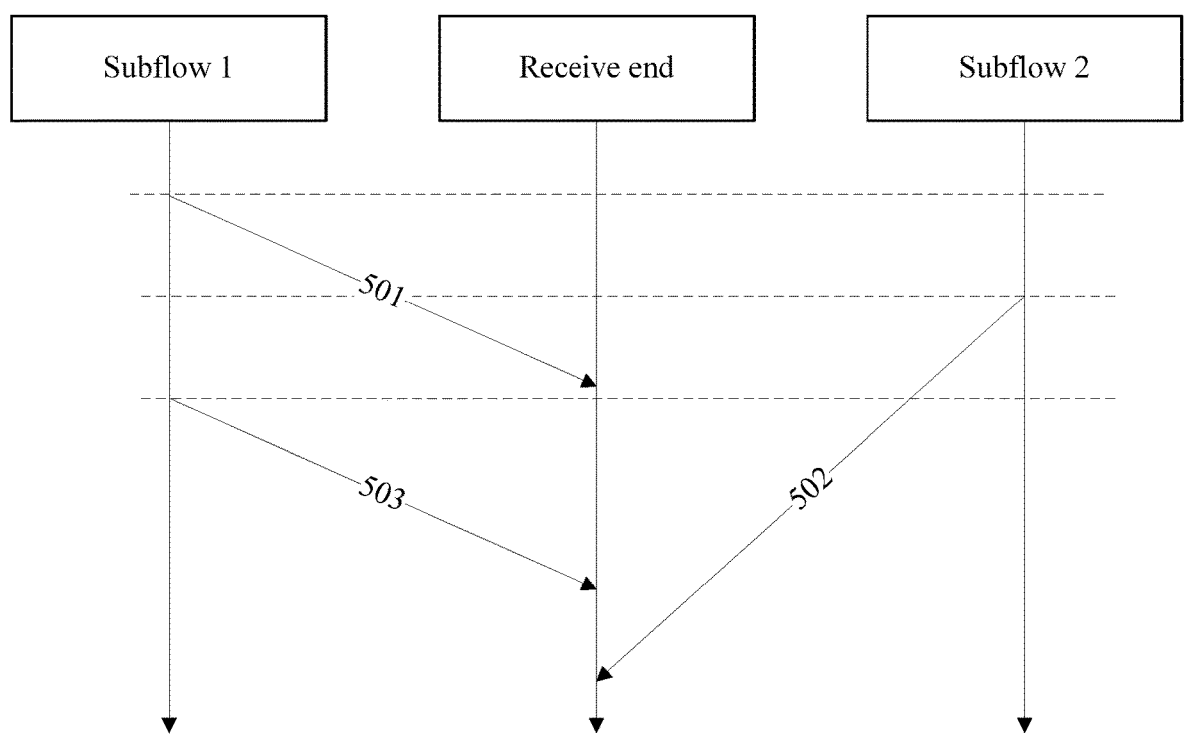
FIG. 5A is a schematic flowchart of a data packet transmission timing according to an embodiment of the present disclosure.

The cache queue is set such that a time from a time point at which the data packet is allocated to the subflow to a time point at which the data packet arrives at the receive end may be adjusted, and a sequence in which data packets arrive at the receive end is adjusted. As shown in FIG. 5A, in the other approaches, for to-be-sent data packets, because RTT of subflows are different, the data packets that are sequentially allocated, for sending, to the subflows by a transmit end arrive at a receive end out of order. For example, in FIG. 5A, data is sent to the receive end using a subflow 1 and a subflow 2. For sequentially sent data packets 501, 502, and 503, the data packet 501 is first sent using the subflow 1, then the data packet 502 is sent using the subflow 2, and finally the data packet 503 is sent using the subflow 1. However, because an RTT of the subflow 1 is less than an RTT of the subflow 2, the data packets sent using the subflow 1 arrive at the receive end faster than the data packet sent using the subflow 2. As a result, the data packets received by the receive end are out of order. To be specific, the data packet 503 is received before the data packet 502.

Figure 5B:
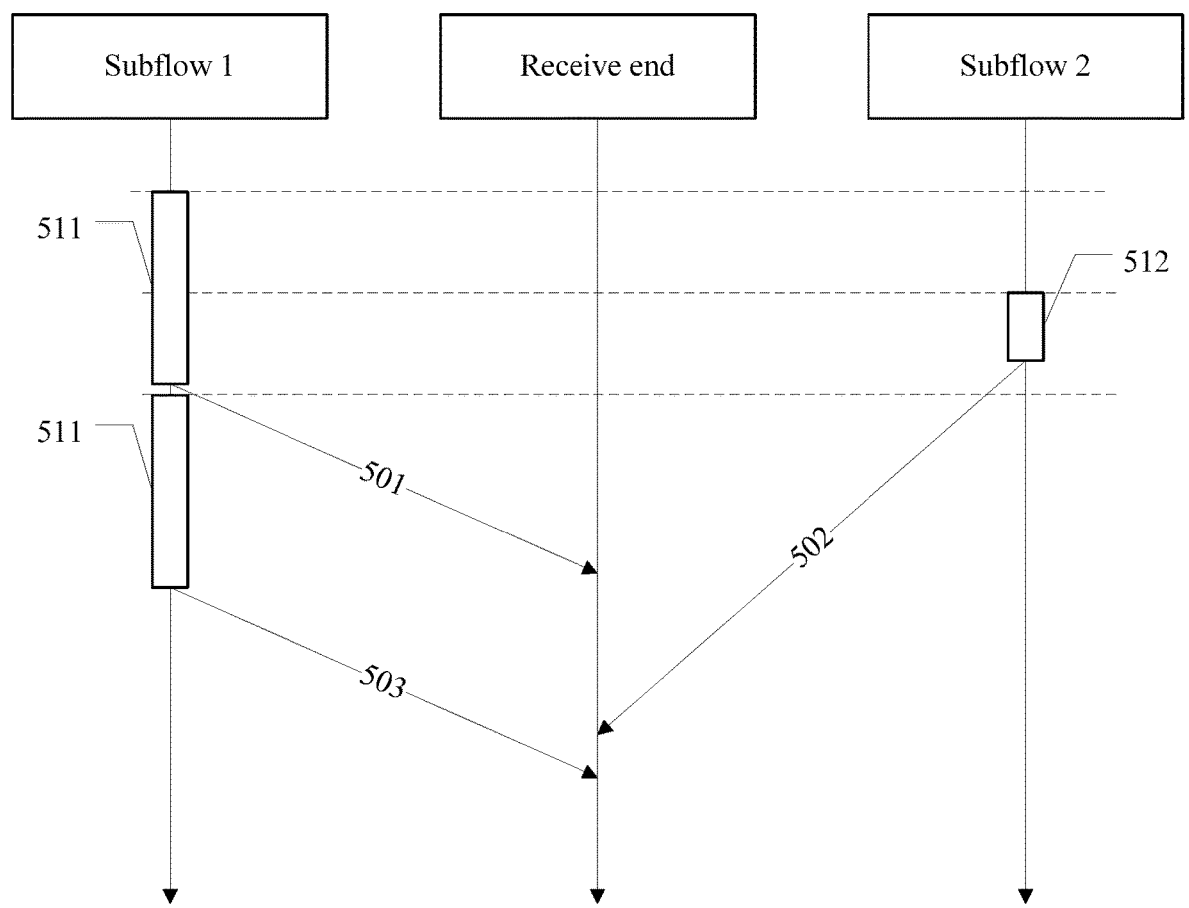
FIG. 5B is a schematic flowchart of another data packet transmission timing according to an embodiment of the present disclosure.

After cache queues are set for subflows, lengths of the cache queues are adjusted, and a cache queue with a longer queue length is set for a subflow with a shorter RTT. This postpones a data packet sending time of the subflow with a shorter RTT, thereby eliminating a time difference caused by an RTT difference, and reducing disorder at the receive end. As shown in FIG. 5B, a cache queue 511 is set for a subflow 1, a cache queue 512 is set for a subflow 2, and a length of the cache queue 511 is greater than that of the cache queue 512. When data packets are sent according to a scenario that is the same as a scenario shown in FIG. 5B, after data packets 501 and 503 are allocated to the subflows, it takes a longer time for dequeuing the data packets 501 and 503 out of the cache queue 511 and sending the data packets to the receive end, thereby eliminating a transmission time difference, caused due to a shorter RTT of the subflow 1, between the subflow 1 and the subflow 2. Therefore, the data packets received at the receive end are still in a correct sequence.

In a possible implementation, during setting of a cache queue, a length of the cache queue may be adjusted through control on a subflow to which a data packet is allocated such that a length of a cache queue of a subflow with a shorter RTT is greater than a length of a cache queue of a subflow with a longer RTT.

Step S402. Place a to-be-sent data packet in a cache queue of to-be-sent data of one of a plurality of subflows used for the aggregated transmission such that a total transmission time from a time point at which the data packet leaves the cache queue of the subflow to a time point at which the data packet arrives at the receive end is consistent with that from a time point at which another data packet leaves a cache queue of another subflow to a time point at which the data packet arrives at the receive end.

After a cache queue is set, a required total time from a time point at which a data packet is allocated to a subflow, that is, enters a cache queue of to-be-sent data of the subflow to which the data packet is allocated, to a time point at which the data packet arrives at the receive end is T. In order that a sequence in which data packets arrive at the receive end is consistent with a sequence in which the data packets are allocated to the subflows, that is, the data packets received by the receive end are not out of order, total times T of the subflows need to be as consistent as possible.

The total time T includes a time T1 from a time point at which the data packet enters the cache queue of to-be-sent data to a time point at which the data packet leaves the queue for sending, and a time T2 in which the data packet is sent using a subflow. T1 may be obtained using the following formula (1):

$$T1 = \frac{\text{Total quantity of bytes of a to-be-sent cache queue} + \text{Quantity of bytes of to-be-sent data packets}}{\text{Quantity of bytes that can be sent in each } RTT} \times RRT. \quad (1)$$

The total quantity of bytes of the cache queue of to-be-sent data is a sum of bytes of data packets in the cache queue of to-be-sent data of the subflow. The quantity of bytes of the to-be-sent data packets is a value of the quantity of bytes of the to-be-sent data packets. The quantity of bytes that can be sent in each RTT is a quantity of bytes that can be sent, using the subflow, in a current RTT cycle. The RTT is a time occupied by one RTT cycle. Using the formula, a time difference between a time point at which the data packet enters the cache queue of to-be-sent data and a time point at which the transmit end sends the data packet can be estimated when the subflow is in a current stable transmission state.

In some scenarios, quantities of bytes in all data packets sent by the transmit end are equal, and the foregoing formula (1) may be converted into the following:

$$T1 = \frac{\text{Quantity of data packets in a to-be-sent cache queue} + 1}{\text{Quantity of data packets that can be sent in each } RTT} \times RRT.$$

In some scenarios, if the cache queue includes a relatively large quantity of data packets, a quantity of to-be-sent data packets may be ignored, and the formula (1) may be further converted into the following:

$$T1 = \frac{\text{Quantity of data packets in a to-be-sent cache queue}}{\text{Quantity of data packets that can be sent in each } RTT} \times RRT.$$

It may be understood that T1 may be estimated using another method in addition to the example provided by the foregoing formula. For example, T1 may be estimated based on an average send rate of monitored subflows and a data amount or a quantity of data packets in a cache queue of to-be-sent data, or a model between a network status of a subflow and a quantity of data packets or a data amount in a cache queue may be established based on historical data such that the time T1 from a time point at which a current data packet enters the cache queue of to-be-sent data to a time point at which the data packet leaves the queue for sending is determined based on a current network status and the quantity of data packets or the data amount in the cache queue.

The subflow transmission time T2 may be considered as half of an RTT, and in this case, the total time T may be as follows:

$$T = \left( \frac{\text{Total quantity of bytes of a to-be-sent cache queue} + \text{Quantity of bytes of to-be-sent data packets}}{\text{Quantity of bytes that can be sent in each } RTT} + 0.5 \right) \times RRT.$$

A value of T may be alternatively obtained based on a sum of a variation of the formula (1) and 0.5 RTT. When there is a relatively large difference between a value of T1 and 0.5 RTT, impact of a value of T2 on T may be ignored, and T1 may be used as the total time T.

The total transmission times T of the subflows need to be as consistent as possible. That is, a difference between the total transmission times T of the subflows needs to be as small as possible. In an implementation, there may be a plurality of implementations. Examples are described as follows.

A. Calculate a current estimated total transmission time T of each subflow, and during allocation of a to-be-sent data packet, allocate the data packet to a subflow corresponding to a smallest T value.

To be specific, as described above, the current estimated total transmission time T of each subflow during allocation is determined, and the data packet is allocated to the subflow corresponding to the smallest T value such that the total transmission times T of the subflows are as consistent as possible.

B. Determine a difference between RTTs of the subflows, based on the difference between RTTs and a quantity of bytes that can be sent in each RTT of the subflows, determine a difference, that makes T values of the subflows be equal, between quantities of bytes of cache queue of to-be-sent datas of the subflows or quantities of data packets in cache queue of to-be-sent datas of the subflows, and during allocation of a data packet, select a subflow corresponding to a smallest quantity, obtained by subtracting the difference, of remaining bytes in a cache queue of to-be-sent data or remaining data packets in a cache queue of to-be-sent data.

As described above, because RTTs of the subflows are different, T2 values are different. To make values of the total times T be the same, a difference between T1 values of the subflows needs to be used to cancel a difference between T2 values. Two subflows a and b are used as an example:

$T1a-T1b=T2b-T2a.$

Values of T1 and T2 are substituted. The difference between the quantities of bytes of cache queue of to-be-sent datas of the subflows or the quantities of data packets in cache queue of to-be-sent datas of the subflows may be determined based on the difference between RTTs and the quantity of bytes that can be sent in each RTT of the subflows.

In addition to the foregoing example, it may be understood that, based on a different method for calculating T1, T2, and the total time T, another method for keeping the total transmission times of the subflows consistent may be further obtained.

Step S403. Sequentially send data packets based on a data packet enqueue sequence according to cache queue of to-be-sent datas of the subflows using the subflows used for the aggregated transmission.

In this embodiment, optionally, a length of a cache queue of to-be-sent data may be further controlled. Because a data packet is allocated based on an RTT of a subflow during allocation, a time T1 of the data packet in the cache queue of to-be-sent data is used to balance a difference between network transmission delays T2 that is caused by an RTT difference. However, when the data packet leaves the cache queue of to-be-sent data for sending, an RTT of a subflow when the data packet is allocated to the subflow may have changed. Therefore, the time T1 may be shortened through control on a length of a cache queue of to-be-sent data of each subflow. That is, a time from a time point at which the data packet is allocated to the subflow to a time point at which the data packet is sent using the subflow is shortened. This reduces a possible change in the RTT in the period of time.

In an implementation, a threshold corresponding to a length of a cache queue of each subflow may be directly set, to limit the queue length. When a length of a cache queue of to-be-sent data of a subflow is greater than a threshold corresponding to the subflow, no data packet is allocated to the subflow again.

In another implementation, it may be determined whether a length of a cache queue of a subflow satisfies a preset condition, to limit the queue length. Examples are described in the following.

(1) When a relationship between a quantity of bytes of data in a cache queue of to-be-sent data of a subflow and a quantity of bytes of a send window (bytes of send window) of the current subflow satisfies a preset condition, for example, the quantity of bytes in the cache queue of to-be-sent data has reached 90% of the quantity of bytes of the send window of the subflow, no data packet enters the cache queue of the subflow again.

(2) When a relationship between a quantity of bytes of data in a cache queue of to-be-sent data of a subflow and a maximum quantity of allowable bytes in flight (maximum bytes in flight) in the current subflow satisfies a preset condition, for example, the quantity of bytes of the data of the cache queue of to-be-sent data has reached 90% of the maximum quantity of allowable bytes in flight in the current subflow, no data packet enters the cache queue of the subflow again.

The length of the cache queue of to-be-sent data in the following may be a quantity of bytes or a quantity of data packets of the cache queue of to-be-sent data, or another value used to measure a data amount in a cache queue.

Based on this embodiment, when the aggregated transmission is performed using the subflows, the data packets are allocated such that total transmission times of the data packets sent using the subflows are relatively consistent. Therefore, the total transmission times of the data packets sent using the subflows are relatively consistent. After the data packets are allocated, the data packets arrive at the receive end after a same or similar time such that the sequence in which the receive end receives the data packets is basically consistent with the sequence in which the transmit end allocates the data packets to the subflows. Therefore, in addition to the technical effect achieved by the foregoing embodiment, in this embodiment, a possibility that the receive end receives out-of-order data packets during the aggregated transmission is further effectively reduced, and data transmission stability and efficiency are improved.

Figure 6:
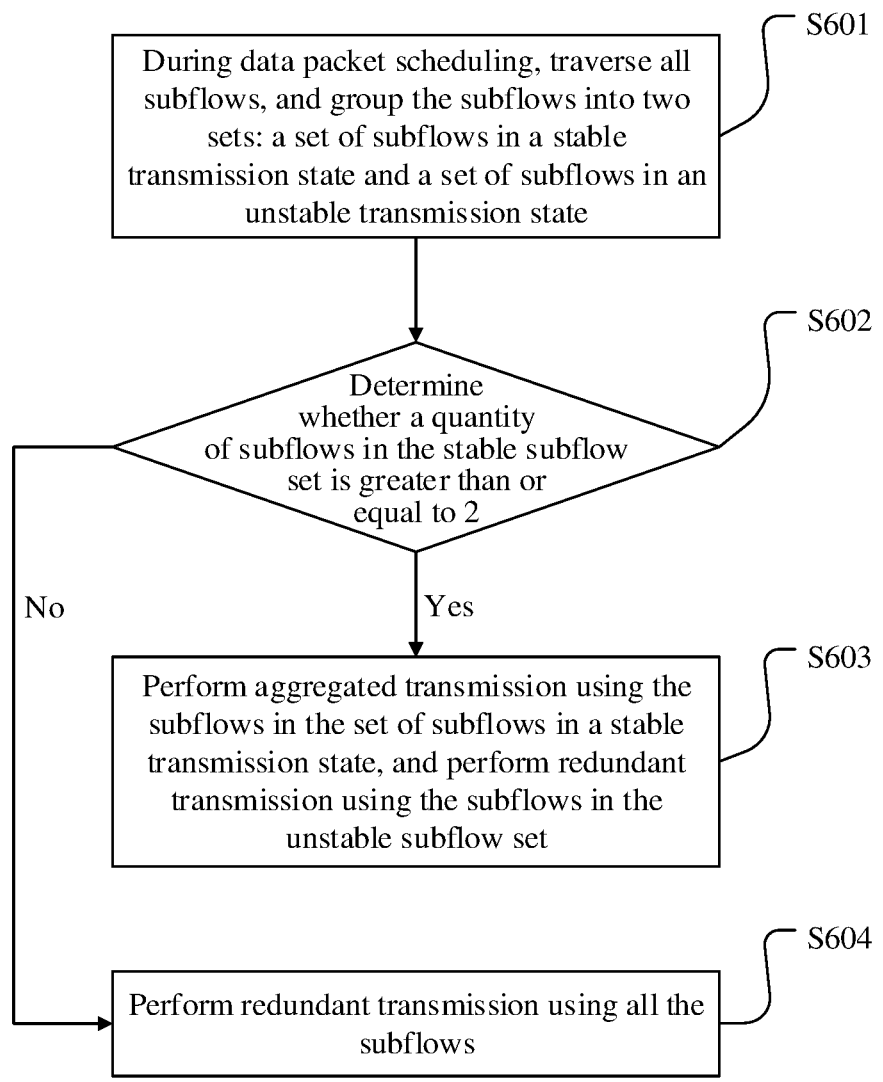
FIG. 6 is a schematic flowchart of another method according to an embodiment of the present disclosure.

With reference to FIG. 6, FIG. 6 is a schematic flowchart of a method according to another embodiment of the present disclosure. This embodiment provides a further discussion with reference to the first embodiment or the second embodiment, and mainly discusses about a specific processing procedure implemented when there are a plurality of subflows and only some of the subflows enter a stable transmission state. Therefore, this embodiment may be understood with reference to the foregoing two embodiments. In the foregoing two embodiments, there are already related discussions about how to determine whether a subflow enters a stable transmission state and how to perform redundant transmission or aggregated transmission. Details are not described in this embodiment again.

When there are more than two subflow links, based on the first embodiment, processing is performed using the following steps.

Step S601. During data packet scheduling, traverse all subflows, and group the subflows into two sets: a set of subflows in a stable transmission state and a set of subflows in an unstable transmission state, where a grouping condition is the same as the condition described in the foregoing embodiments.

Step S602. Determine whether a quantity of subflows in the stable subflow set is greater than or equal to 2.

Step S603. When the quantity of subflows in the stable subflow set is greater than or equal to 2, perform aggregated transmission using the subflows in the set of subflows in a stable transmission state, and perform redundant transmission using the subflows in the unstable subflow set.

Step S604. When the quantity of subflows in the stable subflow set is less than 2, perform redundant transmission using all the subflows.

Figure 7:
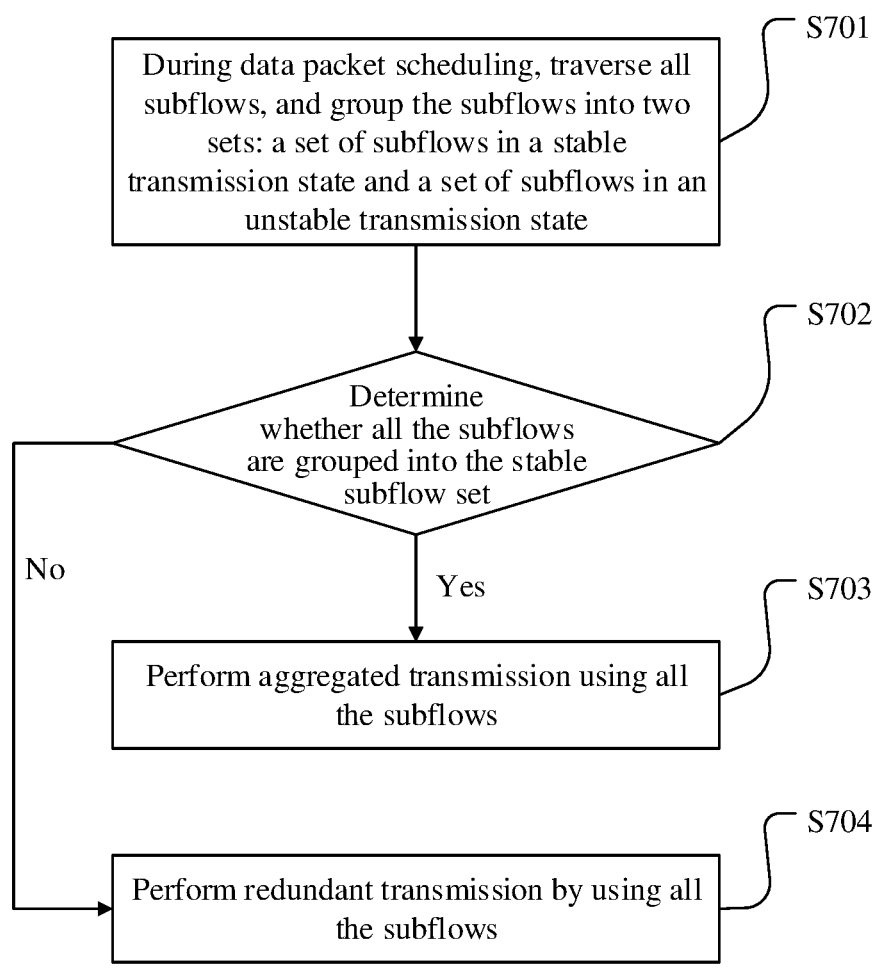
FIG. 7 is a schematic flowchart of another method according to an embodiment of the present disclosure.

With reference to FIG. 7, FIG. 7 is a schematic flowchart of a method according to another embodiment of the present disclosure. Similar to the embodiment corresponding to FIG. 6, this embodiment provides a further discussion with reference to the first embodiment or the second embodiment, and mainly discusses about a specific processing procedure implemented when there are a plurality of subflows and only some of the subflows enter a stable transmission state. Therefore, this embodiment may be understood with reference to the foregoing two embodiments. In the foregoing two embodiments, there are already related discussions about how to determine whether a subflow enters a stable transmission state and how to perform redundant transmission or aggregated transmission. Details are not described in this embodiment again. This embodiment includes the following steps.

Step S701. During data packet scheduling, traverse all subflows, and group the subflows into two sets: a set of subflows in a stable transmission state and a set of subflows in an unstable transmission state, where a grouping condition is the same as the condition described in the foregoing embodiments.

Step S702. Determine whether all the subflows are grouped into the stable subflow set.

Step S703. When all the subflows are grouped into the stable subflow set, perform aggregated transmission using all the subflows.

Step S704. When not all the subflows are grouped into the stable subflow set, perform redundant transmission using all the subflows.

The foregoing two embodiments provide an example data packet scheduling method in a case in which there is a plurality of subflows. The stable subflow set and the unstable subflow set are set, and therefore, subflows in different transmission states are scheduled in different manners. This improves resource utilization of the subflows on a basis of ensuring transmission efficiency and transmission stability.

Figure 8:
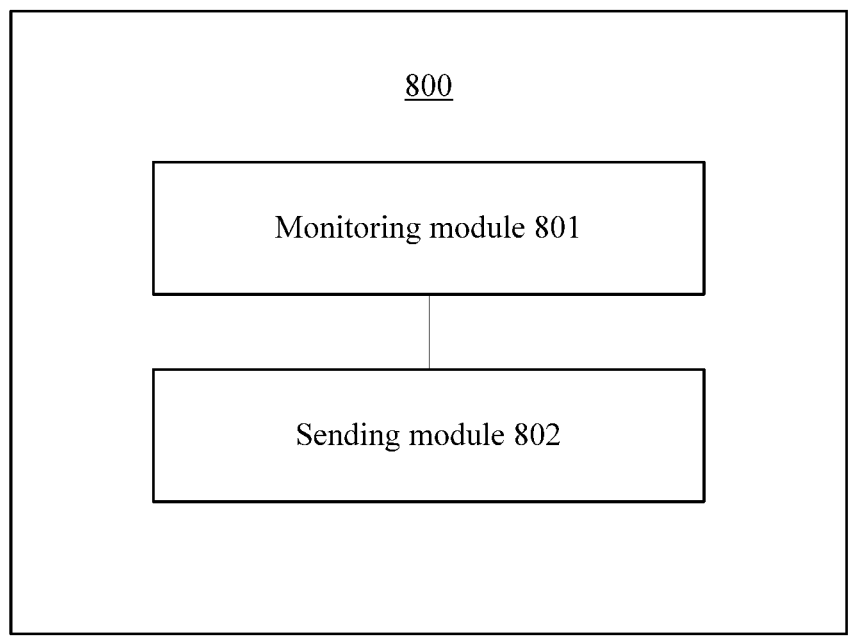
FIG. 8 is a schematic diagram of a logical structure of a network apparatus according to an embodiment of the present disclosure.

With reference to FIG. 8, FIG. 8 is a logical structural diagram of an embodiment of a network device 800 according to the present disclosure. Based on disclosure ideas of the foregoing method embodiments, this embodiment provides a network device including function modules that can implement the foregoing method. The network device 800 includes a monitoring module 801 configured to determine at least one network status parameter of a plurality of subflows, where the monitoring module 801 may be configured to perform step S301 in the foregoing embodiment, and a sending module 802 configured to, when at least one network status parameter of at least two of the plurality of subflows satisfies a preset condition, perform aggregated transmission for data using the at least two subflows, where referring to the foregoing method embodiment, the sending module 802 may be configured to perform step S302 in the foregoing embodiment.

Optionally, the sending module 802 may be further configured to perform steps S303, S304, S401, S402, and S403 in the foregoing methods.

Optionally, with reference to the embodiments corresponding to FIG. 6 and FIG. 7, the sending module 702 may perform sending according to steps S601 to S604 or steps S701 to S704 using the plurality of subflows b and using the network status parameter obtained by the monitoring module.

With reference to the schematic diagram, corresponding to FIG. 2, of the network apparatus for MPTCP transmission, the sending module in this embodiment may be implemented using a data scheduling module and a data sending module in FIG. 2.

The module division in the embodiments of this application is an example, is merely logical function division, and may be other division in actual implementation. In addition, function modules in the embodiments of this application may be integrated into one piece of physical hardware, or each of the modules may exist as independent physical hardware, or at least two modules may be integrated into one module. The integrated module may be implemented in a form of hardware, or may be implemented in a form of a software function module.

According to the network device provided in this embodiment, when the network device sends data using a plurality of subflows, the technical effect of the foregoing embodiments can be achieved.

Figure 9:
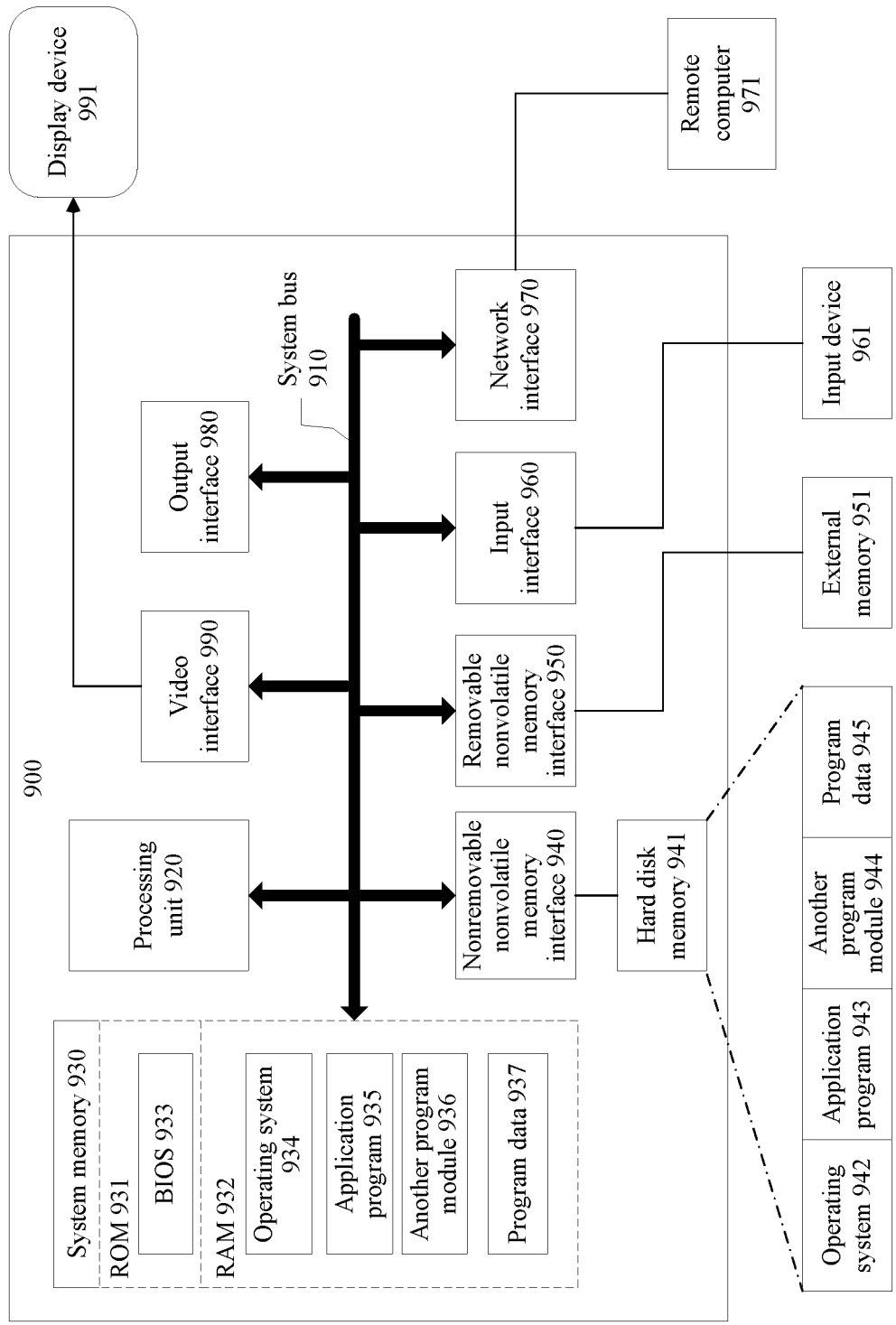
FIG. 9 is a schematic diagram of a hardware structure of a network apparatus according to an embodiment of the present disclosure.

Referring to FIG. 9, an example system for implementing the present disclosure includes a universal computing device in a form of a network device 900. With reference to the system scenario and architecture shown in FIG. 1, the network device in this embodiment may be an execution body of the embodiment of the present disclosure that is described using the foregoing scenario and architecture.

Components of the network device 900 may include but is not limited to a processing unit 920, a system memory 930, and a system bus 910. The system bus 910 couples various system components including the system memory 930 to the processing unit 920. The system bus 910 may be any one of several types of bus structures. Such buses may include a memory bus or a memory controller, a peripheral bus, and a local bus in one bus structure. The bus structures may include an industrial standard architecture (ISA) bus, a micro channel architecture (MCA) bus, an extended ISA (EISA) bus, a Video Electronics Standards Association (VESA) local area bus, and a peripheral component interconnect (PCI) bus.

The network device 900 usually includes a plurality of network device-readable media. The network device-readable media may be any medium that can be effectively accessed by the network device 900, and include a volatile or nonvolatile medium and a removable or nonremovable medium. For example, but not as a limitation, the network device-readable media may include a network device storage medium and a communications medium. The network device storage medium includes volatile, nonvolatile, removable, and nonremovable media. These media may be implemented using any method or technology for storing information such as a network device-readable instruction, a data structure, a program module, or other data. The network device storage medium includes but is not limited to a random access memory (RAM), a read only memory (ROM), an electrically erasable programmable ROM (EEPROM), a flash memory or another memory, a hard disk storage, a solid-state disk storage, an optical disc storage, a magnetic disk cartridge, a magnetic disk storage or another storage device, or any other medium that can store required information and that can be accessed by the network device 900. The communications medium usually includes an embedded computer-readable instruction, a data structure, a program module, or other data in a modular data signal (for example, a carrier or another transmission mechanism), and further includes any information transfer medium. Any combinations thereof should also be included in a range of the network device-readable media.

The system memory 930 includes the network device storage medium, and may be a volatile memory and a nonvolatile memory, for example, a ROM 931 and a RAM 932. A basic input/output system (BIOS) 933 is usually stored in the ROM 931, includes a basic routine program, and helps with information transmission between the components of the network device 900. The RAM 932 usually includes data and/or a program module, and may be instantly accessed and/or immediately operated by the processing unit 920. For example, but not as a limitation, FIG. 9 shows an operating system 934, an application program 935, another program module 936, and program data 937.

The network device 900 may also include another removable or nonremovable and volatile or nonvolatile network device storage medium. Merely used as an example, FIG. 9 shows a hard disk memory 941 that may be a nonremovable and nonvolatile read/write magnetic medium, and an external memory 951 that may be any removable and nonvolatile external memory, for example, an optical disc, a magnetic disk, a flash memory, or a removable hard disk. The hard disk memory 941 is usually connected to the system bus 910 using a nonremovable storage interface (for example, an interface 940), and the external memory 951 is usually connected to the system bus 910 using a removable storage interface (for example, an interface 950).

The drives and the network device storage medium related to the drives that are discussed above and shown in FIG. 9 provide storage for a network device-readable instruction, a data structure, a program module, and other data of the network device 900. For example, as described, the hard disk drive 941 is configured to store an operating system 942, an application program 943, another program module 944, and program data 945. It should be noted that these components may be the same as or may be different from the operating system 934, the application program 935, the other program module 936, and the program data 937.

In this embodiment, the methods in the foregoing embodiments or functions of the logical modules in the foregoing embodiment may be implemented using code or a readable instruction stored in the network device storage medium, and the method may be executed by the processing unit 920 by reading the code or the readable instruction.

A user may use various types of input devices 961 to input a command and information to the network device 900. The various input devices are usually connected to the processing unit 920 using the user input interface 960. The user input interface 960 is coupled with the system bus, or may be connected to a bus structure using another interface, for example, a parallel interface or a Universal Serial Bus (USB) interface. A display device 991 may also be connected to the system bus 910 using a video interface 990. In addition, for example, the network device 900 may also include various peripheral output devices, and the output devices may be connected using, for example, an output interface 980.

The network device 900 may be connected to one or more computing devices, such as a remote computer 971, using a network interface 970. A remote computing node includes a network device, a computing node, a server, a router, a network personal computer (PC), an equivalent device, or another universal network node, and usually includes many or all of the components related to the network device 900 that are discussed above. With reference to the architecture shown in FIG. 1, the remote computing node may be a secondary node, a computing node, or another network device. The logical connection shown in FIG. 9 includes a local area network (LAN) and a wide area network (WAN), or may include another network. The network interface 970 may establish a plurality of TCP connections to the remote computer 971, to perform multi-subflow network data transmission. With reference to the foregoing embodiments, during network data transmission, the network interface 970 may determine, using the foregoing method and based on a network transmission status of links of a plurality of subflows, whether to perform redundant transmission or aggregated transmission using the plurality of subflows, to improve network transmission stability and transmission efficiency.

It may be understood that the embodiment corresponding to FIG. 9 may be a network device, in a universal computer architecture, that can be applied to network transmission performed using a plurality of subflows. However, based on understanding of the functions of the logical modules described in the present disclosure, the functions described in the present disclosure may be also implemented by a network device in another hardware architecture. For example, a device that performs network transmission through a wireless network using an intelligent mobile device may establish a plurality of links through a cellular network, and determine a network transmission status of subflows using a network transmission module, to perform redundant transmission or aggregated transmission.

A person skilled in the art should be aware that in the foregoing examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A network transmission method, comprising:
    determining a network status parameter of each subflow of a plurality of subflows, wherein the subflows are configured to transmit data; and
    performing aggregated transmission of the data using two subflows in response to each network status parameter of the two subflows satisfying a preset condition by:
        transmitting one data packet using one subflow of the two subflows; and
        placing a data packet of the data in a cache queue of to-be-sent data of one of the two subflows such that a difference between data amounts in cache queues of to-be-sent data of the two subflows and transmission delays of the two subflows satisfy a preset relationship, wherein in the two subflows, a data amount in a cache queue of to-be-sent data of a subflow corresponding to a larger transmission delay is less than a data amount in a cache queue of to-be-sent data of a subflow corresponding to a smaller transmission delay, wherein data packets that are transmitted on the two subflows are different from each other.

2. The network transmission method of claim 1, further comprising:
    identifying that each network status parameter of two subflows does not satisfy the preset condition; and
    performing redundant transmission of the data separately using the two subflows by transmitting second data packets using the two subflows, wherein the second data packets are the same.

3. The network transmission method of claim 1, further comprising:
    identifying that a sum of transmission rates of the aggregated transmission is less than or equal to a corresponding threshold; and
    performing redundant transmission of the data separately using the two subflows by transmitting second data packets using the two subflows, wherein the second data packets are the same.

4. The network transmission method of claim 1, wherein the network status parameter comprises at least one of a real-time transmission rate, a congestion control window, a receive window, a quantity of transmitted data packets, a quantity of transmitted data packets that are not acknowledged, a transmission time, a transmission delay variation, a packet loss rate, or a link transmission delay difference between the two subflows.

5. The network transmission method of claim 4, wherein when the network status parameter comprises the link transmission delay difference, the preset condition comprises that the link transmission delay difference is less than or equal to a corresponding threshold, wherein the data packets comprise a first data packet, wherein the first data packet comprises:
    a sending time of the first data packet;
    an identifier of a second data packet and a sending time difference between the first data packet and the second data packet, wherein the second data packet and the first data packet are transmitted using different subflows in the two subflows; or
    an identifier of a third data packet, wherein the third data packet is simultaneously transmitted with the first data packet or transmitted at a preset time interval after the first data packet, and wherein the third data packet and the first data packet are transmitted using different subflows in the two subflows,
    wherein the network transmission method further comprises obtaining a response packet comprising the link transmission delay difference between the two subflows, and
    wherein the link transmission delay difference is based on the first data packet.

6. The network transmission method of claim 1, further comprising placing a data packet of the data in a cache queue of to-be-sent data of one of the two subflows by placing the data packet in a subflow in the two subflows corresponding to a shortest estimated total transmission time, wherein an estimated total transmission time is from a time point at which the data packet enters the cache queue to a time point at which the data packet arrives at a receive end.

7. The network transmission method of claim 1, wherein a data amount in a cache queue of to-be-sent data of each of the two subflows is less than or equal to a threshold corresponding to each corresponding subflow.

8. The network transmission method of claim 1, wherein a data amount in a cache queue of to-be-sent data of each of the two subflows further satisfies at least one of the following conditions:
    a quantity of data packets in the cache queue of the to-be-sent data of each of the two subflows and a quantity of bytes of a send window of corresponding subflow satisfy a first preset relationship; or
    the quantity of the data packets in the cache queue of the to-be-sent data of each of the two subflows and a maximum quantity of allowable data packets in flight in the corresponding subflow satisfy a second preset relationship.

9. A network transmission device, comprising:
    a transceiver;
    a processor coupled to the transceiver; and
    a memory coupled to the processor and configured to store a plurality of instructions that, when executed by the processor, cause the processor to be configured to:
        determine a network status parameter of each subflow of a plurality of subflows, wherein the subflows are configured to transmit data; and
        perform, using the transceiver, aggregated transmission of the data using two subflows in response to each network status parameter of the two subflows satisfying a preset condition, wherein, to perform the aggregated transmission of the data, the instructions further cause the processor to be configured to:
  transmit one data packet using one subflow of the two subflows; and
  place a data packet of the data in a cache queue of to-be-sent data of one of the two subflows such that a difference between data amounts in cache queues of to-be-sent data of the two subflows and transmission delays of the two subflows satisfy a preset relationship, and wherein in the two subflows, a data amount in a cache queue of to-be-sent data of a subflow corresponding to a larger transmission delay is less than a data amount in a cache queue of to-be-sent data of a subflow corresponding to a smaller transmission delay, wherein data packets that are transmitted on the two subflows are different from each other.

10. The network transmission device of claim 9, wherein the instructions further cause the processor to be configured to:
  identify that each network status parameter of two subflows does not satisfy the preset condition; and
  perform, using the transceiver, redundant transmission of the data separately using the two subflows by transmitting second data packets using the two subflows, wherein the second data packets are the same.

11. The network transmission device of claim 9, wherein the instructions further cause the processor to be configured to:
  identify that a sum of transmission rates of the aggregated transmission is less than or equal to a corresponding threshold; and
  perform, using the transceiver, redundant transmission of the data separately using the two subflows by transmitting second data packets using the two subflows, wherein the second data packets are the same.

12. The network transmission device of claim 9, wherein an estimated total transmission time is from a time point at which the data packet enters the cache queue of to-be-sent data to a time point at which the data packet arrives at a receive end.

13. A computer program product comprising computer-executable instructions for storage on a non-transitory computer-readable medium that, when executed by a processor, cause an apparatus to:
  determine a network status parameter of each subflow of a plurality of subflows, wherein the subflows are configured to transmit data; and
  perform aggregated transmission of the data using two subflows in response to each network status parameter of the two subflows satisfying a preset condition, wherein, to perform the aggregated transmission of the data, the computer-executable instructions further cause the apparatus to:
    transmit one data packet using one subflow of the two subflows; and
    place a data packet of the data in a cache queue of to-be-sent data of one of the two subflows such that a difference between data amounts in cache queues of to-be-sent data of the two subflows and transmission delays of the two subflows satisfy a preset relationship, and wherein in the two subflows, a data amount in a cache queue of to-be-sent data of a subflow corresponding to a larger transmission delay is less than a data amount in a cache queue of to-be-sent data of a subflow corresponding to a smaller transmission delay, wherein data packets that are transmitted on the two subflows are different from each other.

14. The computer program product of claim 13, wherein the instructions further cause the apparatus to:
  identify that each network status parameter of two subflows does not satisfy the preset condition; and
  perform redundant transmission of the data separately using the two subflows by transmitting second data packets using the two subflows, wherein the second data packets are the same.

15. The computer program product of claim 13, wherein the instructions further cause the apparatus to:
  identify that a sum of transmission rates of the aggregated transmission is less than or equal to a corresponding threshold; and
  perform redundant transmission of the data separately using the two subflows, wherein the redundant transmission comprises transmitting second data packets using the two subflows, and wherein the second data packets are the same.

16. The computer program product of claim 13, wherein an estimated total transmission time is from a time point at which the data packet enters a cache queue of to-be-sent data to a time point at which the data packet arrives at a receive end.

* * * * *